(12) United States Patent
Reinhardt

(10) Patent No.: US 6,809,435 B2
(45) Date of Patent: Oct. 26, 2004

(54) MECHANISM FOR COMPENSATING THE GRAVITATIONAL FORCE ACTING ON A SLIDER OF A LINEAR MOTOR

(75) Inventor: Thomas Reinhardt, Ettlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/185,505

(22) Filed: Jun. 28, 2002

(65) Prior Publication Data

US 2003/0111913 A1 Jun. 19, 2003

(30) Foreign Application Priority Data

Dec. 14, 2001  (EP) .............................................. 01129774

(51) Int. Cl.⁷ ............................................. H02K 41/00
(52) U.S. Cl. ...................................................... 310/12
(58) Field of Search ............................. 310/12, 13, 14; 318/135

(56) References Cited

U.S. PATENT DOCUMENTS

| 4,188,552 | A | | 2/1980 | Brimer ......................... 310/13 |
| 4,215,283 | A | | 7/1980 | Hinds .......................... 310/14 |
| 5,297,658 | A | * | 3/1994 | Grinaski et al. ............. 187/251 |
| 5,518,550 | A | * | 5/1996 | Korenaga et al. ............ 118/729 |
| 5,668,421 | A | * | 9/1997 | Gladish ........................ 310/12 |
| 5,726,508 | A | * | 3/1998 | Neff et al. ...................... 310/12 |
| 5,768,062 | A | * | 6/1998 | Anderson et al. ......... 360/245.9 |
| 5,817,954 | A | * | 10/1998 | Kahng et al. ............. 73/863.84 |
| 5,909,710 | A | * | 6/1999 | Cummins ................... 104/23.2 |
| 6,479,991 | B1 | * | 11/2002 | Korenaga .................... 324/226 |
| 6,664,702 | B2 | * | 12/2003 | Soroushian ................. 310/246 |
| 6,665,053 | B2 | * | 12/2003 | Korenaga ..................... 355/72 |

FOREIGN PATENT DOCUMENTS

| EP | 1 113 568 A2 | 4/2001 |
| JP | 61247265 | 4/1986 |
| JP | 08275453 | 10/1996 |

OTHER PUBLICATIONS

Ramos, H., Examiner. European Search Report, Application Number EP 01 12 9774, dated May 31 2002.

* cited by examiner

Primary Examiner—Thanh Lam
Assistant Examiner—Judson H. Jones

(57) ABSTRACT

A mechanism for compensating the gravitational force acting on a slider of a linear motor, in particular of an electro-magnetic direct linear motor, and acting on a load to be carried and moved by the slider. To compensate for the gravitational force, the mechanism exhibits a spring element, which exerts an elastic restoring force against the gravitational force on the slider.

9 Claims, 3 Drawing Sheets

MECHANISM FOR COMPENSATING THE GRAVITATIONAL FORCE ACTING ON A SLIDER OF A LINEAR MOTOR

FIELD OF THE INVENTION

The invention relates to a mechanism for compensating the gravitational force acting on a slider of a linear motor, in particular of an electromagnetic direct linear motor, and acting on a load to be carried and moved by the slider, capable of moving along a travel path.

DISCUSSION OF THE BACKGROUND ART

Such linear motors exhibit significant advantages over conventional drives such as servo-motors with belts, step motors with spindles, mechanical disk cams, pneumatic cylinders or mechanical levers. Electro-magnetic direct linear motors consist essentially of two components, namely a fixed stator and a movable slider. These two components are connected by neither drag contact nor cable, in other words, they are electronically contact-free connected. The linear translational lifting movement is therefore generated directly, without mechanical gears, belts or levers, by means of electromagnetic forces, i.e. without additional mechanical elements susceptible to wearing. This enables such linear motors to effect extremely dynamic movements with particular ease and without additional components.

One problem encountered by such linear motors is that when arranged vertically and in a switched off condition, the slider falls down under gravity. A vertical arrangement also causes the working point of the drive to shift unfavourably. In the worst case, the constant force allowed by a vertically arranged linear motor is, due to the development of heat, insufficient to permanently support and move a certain load. The linear motor must then be switched off or cooled down, with considerable expense.

Accordingly, it is a purpose of the invention to create a mechanism to compensate the gravitational force at linear motors, which avoids the aforementioned disadvantages and which is designed simple and compact.

SUMMARY OF THE INVENTION

In accordance with the invention, this task is solved by a mechanism for compensating the gravitational force acting on a slider. The mechanism includes a spring element that exerts on the slider an elastic restoring force opposite the gravitational force. Unlike an arrangement which enables the gravitational force to be compensated by a counterweight, use of the spring element as defined by the invention does not have a negative affect on the dynamics of the system. The purpose of the invention is therefore, with the aid of a spring element connected to the slider and the stator, to achieve compensation of the gravitational force acting on the slider and the load potentially to be supported and moved by it, with the aid of opposing, elastic restoring forces. Determined by this mechanical gravitational compensation, the mechanism can be designed simple and compact and the linear motor can be operated reliably and without interruption over long periods.

Advantageously, the restoring force of the spring element is coordinated with and preferably adjustable to the mass of the slider and the load in such a way that the slider can be brought into a position of balance, wherein the state of balance, of the system is at a desired operating point of the linear motor, when said linear motor is idle.

In this way it is avoided with certainty that the rotor is accelerating up together with the load supported and moved by it, which in turn prevents risk of damage. It is also advantageous if the restoring force of the spring element is set or will be set such that the slider together with ist load is moved, when the linear motor is in an idle state, slowly in the direction of gravity, i.e. in a downwards direction.

It is particularly advantageous if the restoring force of the spring element is essentially constant over the travel path and/or the stroke of the slider. This creates favourable and reproducible operating conditions for the linear motor.

In accordance with a particularly advantageous embodyment of the invention, the spring element is embodied with a torsional or spiral spring, in particular with a spiral flat spring. Such a spring element allows the aforementioned functions in a particularly advantageous manner and allows for a particularly compact design of the mechanism.

This situation can be further improved, if the spiral spring is mounted in a drum rotatable on a rotational axis, wherein the spiral spring is supported at one of its ends against the drum and at its other end against a support component connected to a stator of the linear motor.

Particularly advantageous force transmission and operating conditions can be achieved by a connecting element which can be rolled up and which is attached at one of its ends to the drum and at its other end to the slider of the linear motor. If this connecting element is further embodied as a strip or cable that can be rolled up on an outer periphery of the drum, the force transmission and operating conditions can be further improved.

It is also advantageous, if the support component is attached to an adjusting body, which is rotatable on a rotational axis and which is preferably designed with a housing for receiving the spiral spring and which is lockable against torsion at various positions of angular rotation with the aid of a fixing device. In this way, the zero point of the mechanism, i.e. its position of angle of rotation can be set to precisely the centre of the maximum positioning range of the linear motor, by the adjusting body being rotated preferably manually into the desired position and then in this position, locked against torsion with the aid of the fixing device. A Screw or a bolt have proved to be particularly suitable fixing devices. These can be inserted through and/or screwed into through holes parallel to the rotational axis, in the adjusting body and into openings on the stator side formed for this purpose. These openings are arranged on a radius around the rotational axis, preferably offset to the same distance. An even finer adjustment and proportioning option can be achieved in that several bore holes are arranged around the periphery of the adjusting body, offset by preferably the same distance, for receiving the screw or the bolt, wherein the distances between the bore holes in the adjusting body are designed to be varied and preferably larger than the distances between the bore holes in the support body on the stator side.

A particularly compact arrangement, in particular an axle body (z-axis) of a handling apparatus enabling linear movements in a vertical direction, can be achieved in that the slider, preferably embodied as a coil component for an electromagnetic direct linear motor, receives the stator in the form of a tube or rod and is mounted on it.

It is understood however, that as an alternative, the slider preferably embodied as a magnetic component for an electromagnetic direct linear motor, can also be formed as a tube or rod, which is received and mounted in the stator. In both cases, the linear motor is advantageously embodied as a permanently excited, two-phase synchronous motor. Electro-magnetic direct linear motors also offer the advantage that with the aid of suitable sensors, for example magnetic field and/or hall sensors, an integrated position recording can be achieved.

In accordance with a particularly advantageous application, the invention relates also to a fluid analysis device, in particular for micro-fluid analysis, for example the bio-analysis, i.e. in particular for DNA, RNA and/or protein analysis, with a handling device for samples, for the analysis, removal and/or adding of samples, which contains a mechanism in accordance with one of the claims 1–10.

It is understood that any combination whatsoever of the aforementioned measures are also possible.

BRIEF DESCRIPTION OF THE DRAWINGS

Further advantages, features and principal points of the invention appear in the section of the description below, in which a preferred embodiment of the invention is described in more detail with the aid of the Figures.

It shows.

DETAILED DESCRIPTION OF THE PREFERRED EMBODIMENT

Figure 1:
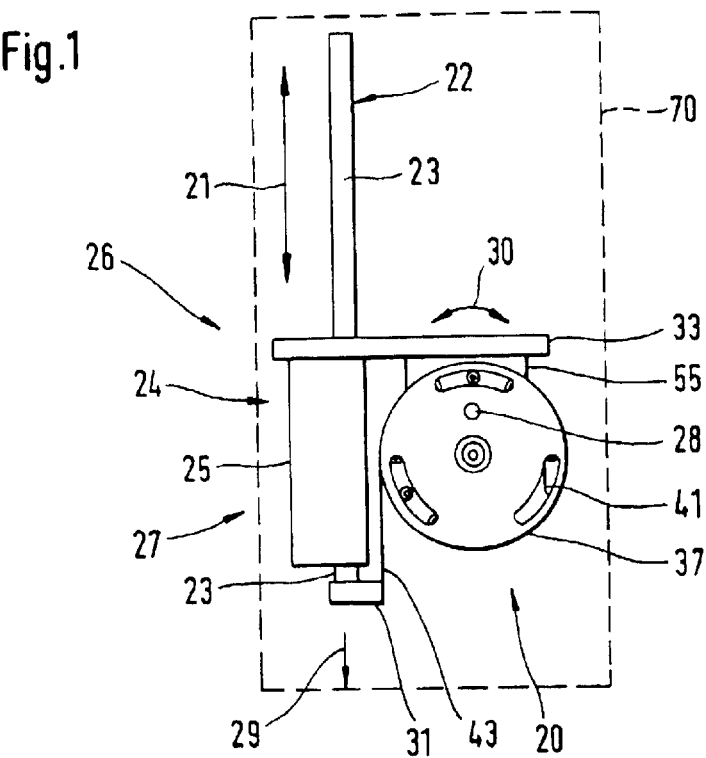
FIG. 1: a partially schematic top view of a mechanism for compensating the gravitational force acting on a slider of an electromagnetic linear motor, wherein the slider is embodied here as a magnetic rod, which is taken up and mounted in the coil component of the stator and wherein the mechanism is fitted into a handling device of a fluid analysis device.

The mechanism 20 for compensating the gravitational force 29 acting on a slider 22, 32 of a linear motor 26 and acting on a load to be carried and moved by it, capable of moving along a travel path 21, comprises as an essential construction element a spring element 28, which is embodied here as a spiral spring 35 with a flat spring. The linear motor 26 is embodied as an electromagnetic direct linear motor 27 and in this case as a permanently excited, two-phase synchronous motor with a stator 24, 34 and a slider 22, 32 movable relative to it. The spiral spring 35 is received in a housing 41, which is in turn received in the drum 37 rotatable around the rotational axis 36. In the fitted condition, the spiral spring 35 is supported at its inside end against a support component 40, formed like a nose, of the adjusting body 50 formed with the housing 41, whilst the outer end 39 of the spiral spring 35 is support against the supporting part 57, formed in the shape of a recess, of the drum 37. As shown by the Figures, in its fitted condition, the spiral spring 35 is completely received within the drum 37.

The drum 37 exhibits a front wall 47 formed vertical to the rotational axis 36. The front wall 47 is embodied like a circular plate and at its periphery edges, passes into the cylindrical drum wall 48, formed like a tube and extending parallel to the rotational axis 36. The drum wall 48 exhibits a cross-section and has a local opening, extending in the direction of the periphery, for receiving a fixing bolt. This receives the drum-side end 44 of a connecting element 42 embodied as a strip 43, which is folded around the bolt for securing to the drum wall 48. The strip 43 is preferably embodied with a textile belt with a hook on the end side. As shown in particular from FIGS. 3 and 4, the strip 43, which exhibits sufficient length to guarantee the travel path 21, is wound on the drum 37, where it lies adjacent to the outer periphery 46 of the drum wall 48. The drum diameter and the strip length are embodied matching the travel path 21 in such a way that the strip 43, using almost the entire periphery of the drum, can be wound around the drum 37, without two parts of the strip overlapping each other. This creates a constant arm, which means that constant force or moment ratios are guaranteed.

The housing 41 is part of an adjusting body 50, which serves to enable a precise positioning of the zero point of a body fixable to the free end 45 of the strip 43 via the connecting piece 31, or the load, in such a way that the connecting piece 31 is located in a basic position around the centre of the maximum possible travel path 21. This position can be achieved by the housing 41 being rotated manually around the rotational axis 36, until the desired zero point position is reached. This rotational position of the housing can then be locked against torsion using a fixing means embodied in this case with a screw 51. For this purpose, the housing wall exhibits a majority of through bore holes created here at equal distances along the periphery, running parallel to the rotational axis. The screw 51 can be inserted through one of these bore holes and then screwed into one of the openings 53 in the holding plate 55. The openings 53 are offset against each other at equal angular distances and arranged at the same radius as the continuous bore holes 52. However, the angular distances of the openings 53 are smaller here than the angular distances between the bore holes 52. This enables a precisely adjustable zero point position to be achieved in defined specified yet small distances.

Figure 3:
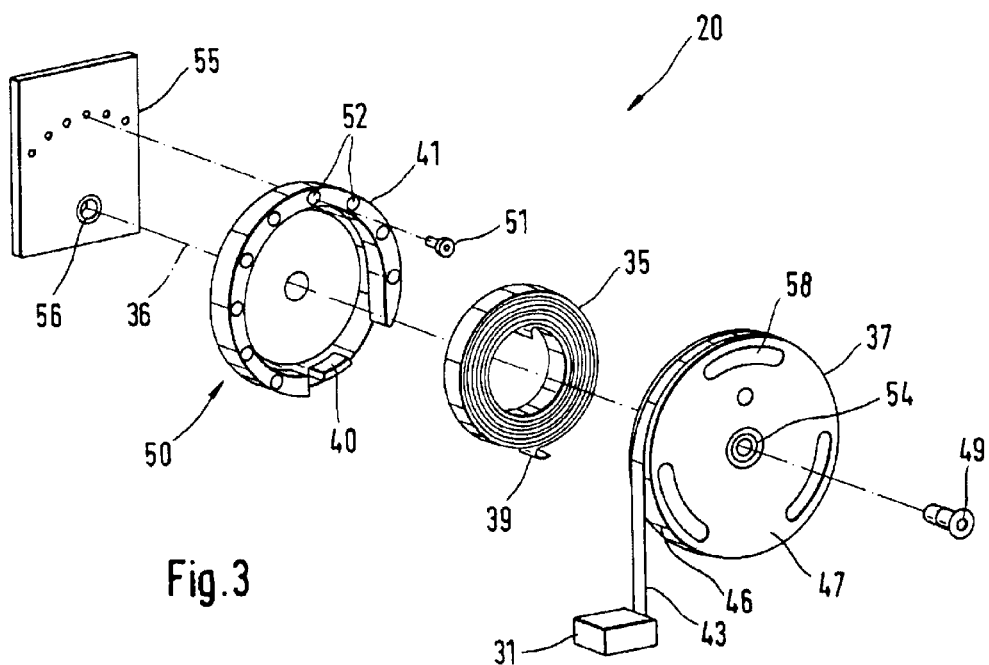
FIG. 3: an exploded drawing of the mechanism in a first view.
Figure 4:
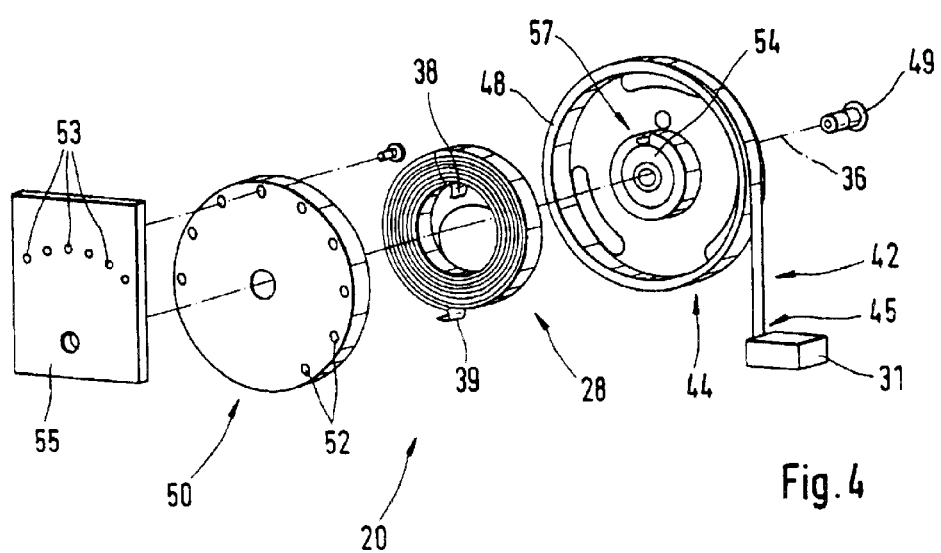
FIG. 4: an exploded drawing of the mechanism in a view rotated through 90° from FIG. 3.

As shown by FIG. 3, the holding plate 55 exhibits the bearing sleeve 56, on which the housing 41 of the adjusting body 50 is mounted via a suitably formed bearing opening. With the aid of the two exploded diagrams shown in FIGS. 3 and 4, it can clearly be seen that to install and/or remove the mechanism, a bearing bolt 49 is used, which receives a ball bearing 54, onto which the drum 37 is rotatably mounted and which can be inserted and screwed through the bearing sleeve 56. In order to make an adjustment to the zero point position from outside when the mechanism 20 is in the fitted condition, the end wall 47 of the drum 37 exhibits, in the area of the internal fixing screw 51, here three elongated holes 58 arranged offset to each other at equal angular distances. A suitable operating tool, for example an inserting key for screwing and/or unscrewing the screw 51 fitted with a hexagon socket can be inserted through these elongated holes.

Figure 2:
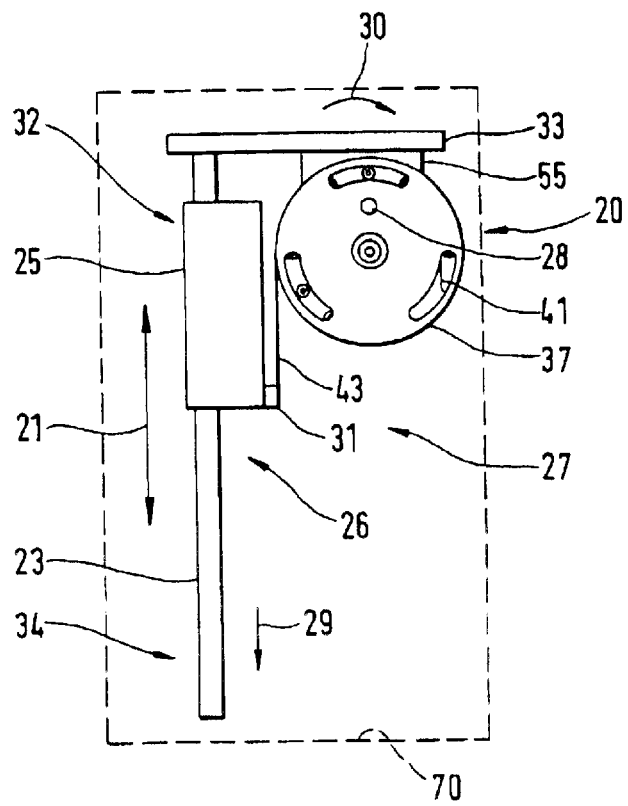
FIG. 2: a partially schematic top view of a mechanism for compensating the gravitational force acting on the slider of an electro-magnetic linear motor, wherein the slider is embodied here as a coil component, which takes up the magnetic rod of the stator and is mounted on it, wherein the mechanism is also fitted into a handling device of a fluid analysis device.

FIGS. 1 and 2 each show two alternative options for fixing the connecting piece 31 provided at the free end of the strip 43 to a slider 22, 32 of the linear motor 26.

As shown by FIG. 1, connected to the connecting piece 31 is the end of a slider 22, which embodies here the magnetic rod 23 of an electromagnetic direct linear motor 27. The magnetic rod 23 is received into the coil component 25 of the stator 24 of the linear motor 26 and mounted there with a small degree of play. In contrast, the stator 24 is firmly connected to the holding plate 55 via the yoke 33 so that these elements consequently remain fixed. In the design example shown in FIG. 1, the magnet rod 23 can be translationally moved along the travel path 21 and relative to the coil component 25 embodied as a stator 24.

In contrast, according to the design example shown in FIG. 2, the magnetic rod 23 is securely connected to the yoke 33, i.e. in this case, the magnetic rod 23 forms the stator 34. Accordingly in this design example, the slider 32 is embodied with the coil component 25, which receives the magnetic rod 23 of the stator 34 and which is mounted on it with a small degree of play.

Figure 5:
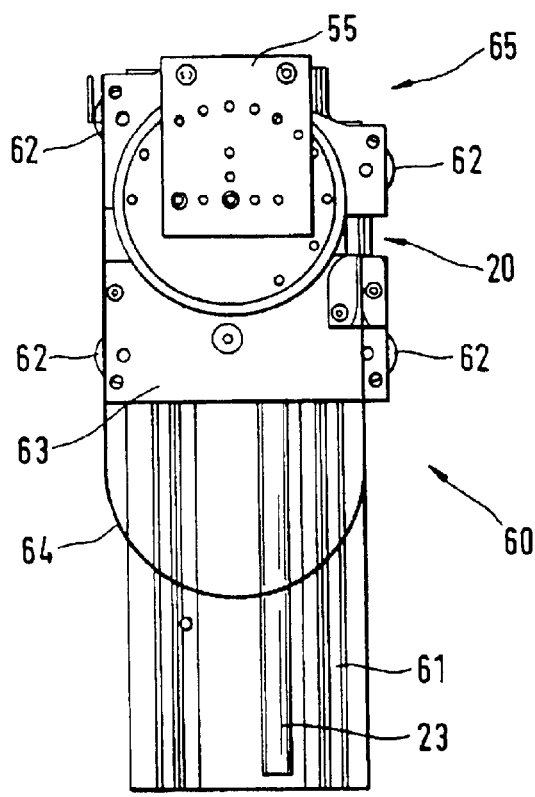
FIG. 5: a top view on a z-axis of a handling device with the mechanism in accordance with the invention for compensating the gravitational force acting on a slider of an electro-magnetic direct linear motor formed with a coil component.
Figure 6:
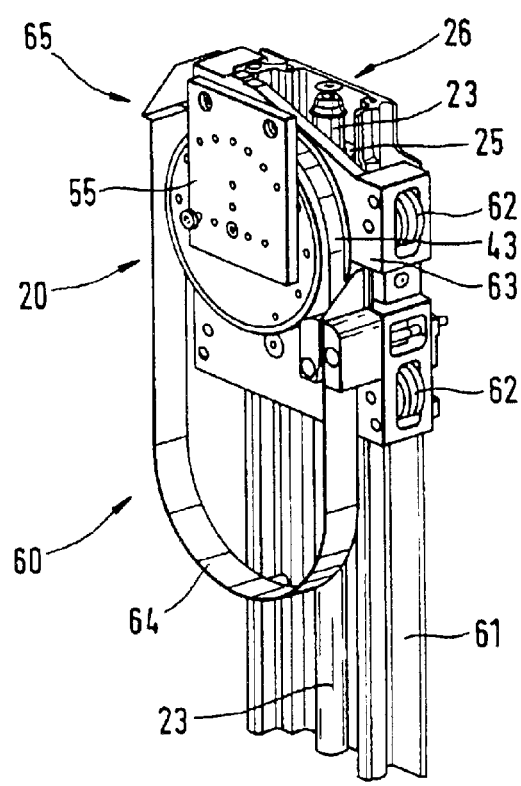
FIG. 6: a three-dimensional view of the z-axis of the handling apparatus in accordance with FIG. 5.

FIGS. 5 and 6 show a preferred application example of the mechanism 20. This is an application for what is referred to as an z-axis 60, to be mounted vertically, for a handling apparatus 65. This type of handling apparatus 65 can be used, in accordance with a particularly preferred application, in a fluid analysis device 70, in particular for micro-fluid analysis, for example for bio-analysis, where it is used to manipulate samples, sample analysis and/or removing or adding samples. The fluid analysis device 70 is shown schematically in FIGS. 1 and 2 by dotted lines.

The vertical z-axis 60 consists essentially from a guide rail 61 to which a running carriage 63 supporting the mechanism 20 is guidably mounted by means of two opposing bearing rollers 62. The mechanism 20 is securely connected to the guide rail 61 and also to the magnetic rod 23, which also in this case forms the stator, by means of the holding plate 55. For this purpose, the magnetic rod 23 exhibits at its upper end a fixing screw, wherein to improve clarity in FIG. 4, the yoke 33 has been omitted. Accordingly, the coil component 25 in the design examples shown in FIGS. 5 and 6 embodies the slider, which is securely connected to the running carriage 63. The electrical connection of the linear motor 26 is created by means of the strip-shaped electrical cable 64, which is designed to have a length matching that of the maximum travel path 21.

In the design examples shown in FIGS. 5 and 6, the linear motor 26 allows a maximum holding force of 33 Newton and a permanent force of 9 Newton, wherein the entire system can be used in a temperature range of between 0° Celsius and up to approximately 50° Celsius. In combination with the mechanism 20 for compensating the gravitational force, the operating point of system can be accurately set, wherein the following characteristic data is achieved: travel path 21 or stroke of up to around 150 mm; loads of up to around 2 kg; small, compact device dimensions, as particularly used in laboratories.

The compact structure of the linear motor 26 and the compact arrangement, together with the gravitational force compensation mechanism 20, contribute towards achieving a compact z-axis 60. At the same time, the drive, with the described mechanism 20, the guide rails 61 and the carriage 63 are accommodated within a square cross-section of 148×55 mm. Given a guide length of the magnetic rod 23 of around 300 mm, a stroke of around 160 mm is achieved, without the components projecting beyond the outline of the z-axis.

What is claimed is:

1. A mechanism for compensating a gravitational force acting on a slider of a linear motor, and acting on a load to be carried and moved by the slider along a travel path substantially parallel to said gravitational force, comprising:

a spring element that exerts, on the slider, an elastic restoring force opposite the gravitational force, wherein the restoring force of the spring element is coordinated with and adjustable to a mass of the slider and the load such that the slider can be brought into a state of balance when the linear motor is idle, and wherein the restoring force of the spring element is essentially constant over the travel path of the slider.

2. A mechanism in accordance with claim 1, wherein the spring element is embodied with a torsional or spiral spring.

3. A mechanism in accordance with claim 1, wherein the slider takes up the stator in the form of a tube or rod and is mounted on it.

4. A mechanism in accordance with claim 1, wherein the slider is in the form of a tube or rod, which is taken up and mounted in the stator.

5. A mechanism for compensating the gravitational force acting on a slider of a linear motor, in particular of an electro-magnetic direct linear motor, and acting on a load to be carried and moved by the slider, capable of moving along a travel path, comprising:

a spring element that exerts on the slider an elastic restoring force opposite the gravitational force, wherein the spring element is embodied with a torsional or spiral spring, wherein the spiral spring is mounted in a drum rotatable on a rotational axis, and wherein the spiral spring is supported at one of its ends against the drum and at its other end against a support component connected to a stator of the linear motor.

6. A mechanism in accordance with claim 5, wherein a connecting element which can be rolled up, is attached at one of its ends to the drum and at its other end to the slider of the linear motor.

7. A mechanism in accordance with claim 6, wherein the connecting element is embodied as a strip or cable that can be rolled up on an outer periphery of the drum.

8. A mechanism in accordance with claim 5, wherein the support component is attached to an adjusting body which is rotatable on a rotational axis and preferably designed with a housing for receiving the spiral spring and which is lockable against torsion at various positions of angular rotation with the aid of a fixing device.

9. A fluid analysis device, comprising:

a handling device having a mechanism for compensating a gravitational force acting on a slider of a linear motor and acting on a load to be carried and moved by the slider along a travel path substantially parallel to said gravitational force, wherein the mechanism includes a spring element that exerts, on the slider, an elastic restoring force opposite the gravitational force, and wherein the restoring force of the spring element is coordinated with and adjustable to a mass of the slider and the load such that the slider can be brought into a state of balance when the linear motor is idle, and wherein the restoring force of the spring element is essentially constant over the travel oath of the slider.

* * * * *